(12) United States Patent
Hirota et al.

(10) Patent No.: US 11,007,499 B2
(45) Date of Patent: May 18, 2021

(54) FLUIDIZED-BED-TYPE REACTOR, AND METHOD FOR MANUFACTURING TRICHLOROSILANE

(71) Applicant: TOKUYAMA CORPORATION, Yamaguchi (JP)

(72) Inventors: Kenji Hirota, Yamaguchi (JP); Katsuya Ogihara, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 16/652,050

(22) PCT Filed: Nov. 16, 2018

(86) PCT No.: PCT/JP2018/042558
§ 371 (c)(1),
(2) Date: Mar. 29, 2020

(87) PCT Pub. No.: WO2019/098346
PCT Pub. Date: May 23, 2019

(65) Prior Publication Data
US 2020/0276552 A1    Sep. 3, 2020

(30) Foreign Application Priority Data

Nov. 20, 2017    (JP) .............................. JP2017-223143

(51) Int. Cl.
*B01J 8/00*    (2006.01)
*B01J 8/18*    (2006.01)
(Continued)

(52) U.S. Cl.
CPC .............. *B01J 8/24* (2013.01); *B01J 8/1827* (2013.01); *B01J 8/1872* (2013.01); *C01B 33/10736* (2013.01); *B01J 2208/00548* (2013.01)

(58) Field of Classification Search
CPC ..... B01J 8/00; B01J 8/18; B01J 8/1818; B01J 8/1827; B01J 8/1872; B01J 8/24;
(Continued)

(56) References Cited

U.S. PATENT DOCUMENTS 5,776,416 A    7/1998    Oda
8,252,241 B2 *  8/2012   Narukawa .............. B01J 8/1872
                                                     422/139
(Continued)

FOREIGN PATENT DOCUMENTS

CN    201882919    6/2011
CN    203922739    11/2014
(Continued)

OTHER PUBLICATIONS

International Preliminary Report on Patentability for PCT/JP2018/042558, dated May 26, 2020, 6 pages.
(Continued)

*Primary Examiner* — Natasha E Young
(74) *Attorney, Agent, or Firm* — Casimir Jones, SC; Robert A. Goetz

(57) ABSTRACT

A fluidized-bed reactor (1A) includes a reaction vessel (10A) configured to contain metallurgical grade silicon powder and a hydrogen chloride gas, and a portion of a side wall (w) which portion extends along at least 80% of a height extending from a gas feed opening (21), which is provided in a lower part of the reaction vessel (10A), to a top face of a fluid bed (40) has such a tapered shape that a cross section of the reaction vessel (10A) which cross section is taken perpendicular to a height direction of the reaction vessel (10A) increases in area in an upward direction.

5 Claims, 4 Drawing Sheets

(51) Int. Cl.
  *B01J 8/24* (2006.01)
  *C01B 3/00* (2006.01)
  *C01B 3/08* (2006.01)
  *C01B 33/107* (2006.01)

(58) Field of Classification Search
  CPC .......... B01J 2208/00; B01J 2208/00008; B01J 2208/00548; C01B 33/00; C01B 33/08; C01B 33/107; C01B 33/1071; C01B 33/10715; C01B 33/10731; C01B 33/10736
  See application file for complete search history.

(56) References Cited

U.S. PATENT DOCUMENTS

| | | |
|---|---|---|
| 2009/0238748 A1 | 9/2009 | Kitagawa et al. |
| 2010/0183496 A1 | 7/2010 | Narukawa |
| 2012/0164053 A1 | 6/2012 | Narukawa |
| 2016/0131584 A1* | 5/2016 | Goebel ................. G01N 21/65 423/342 |

FOREIGN PATENT DOCUMENTS

| | | | |
|---|---|---|---|
| JP | 52-129679 | 10/1977 | |
| JP | 09-169514 | 6/1997 | |
| JP | 9-194207 | 7/1997 | |
| JP | 2009-256197 | 11/2009 | |
| JP | 2010-189256 | 9/2010 | |
| JP | 2011-063480 | 3/2011 | |
| JP | 2011-184242 | 9/2011 | |
| JP | 2015-089859 | 5/2015 | |
| WO | WO-2014035878 A1 * | 3/2014 | ............ B01J 8/1827 |

OTHER PUBLICATIONS

International Search Report for PCT/JP2018/042558, dated Feb. 5, 2019, 1 page.

* cited by examiner

FLUIDIZED-BED-TYPE REACTOR, AND METHOD FOR MANUFACTURING TRICHLOROSILANE

This application is a national stage application claiming priority to PCT/JP2018/042558, now WO2019/098346, filed on Nov. 16, 2018, which claims priority to Japanese Patent Application Serial No. JP 2017-223143, filed on Nov. 20, 2017.

TECHNICAL FIELD

The present invention relates to a fluidized-bed reactor and a method for producing trichlorosilane.

BACKGROUND ART

Conventionally, an apparatus for producing trichlorosilane by causing hydrogen chloride and metallurgical grade silicon powder to react with each other has been known. For example, Patent Literatures 1 and 2 disclose techniques in each of which a side wall, which surrounds a fluid bed formed by a flow of metallurgical grade silicon powder which is caused to flow by hydrogen chloride gas, has a portion having a tapered shape.

CITATION LIST

Patent Literature

[Patent Literature 1]
Specification of Chinese Utility Model Publication No. 201882919 (Publication Date: Jun. 29, 2011)
[Patent Literature 2]
Specification of Chinese Utility Model Publication No. 203922739 (Publication Date: Nov. 5, 2014)

SUMMARY OF INVENTION

Technical Problem

However, in the techniques disclosed in Patent Literatures 1 and 2, the portion having the tapered shape accounts for a small percent of the sidewall surrounding the fluid bed, specifically, less than 50% of a length of the sidewall surrounding the fluid bed. Therefore, there are problems that erosion is likely to occur in a reaction vessel, and that the metallurgical grade silicon powder is scattered out of the reaction vessel by a jet. Further, the above fluidized-bed reactor has a problem that temperatures rise locally in the reaction vessel.

It is an object of an aspect of the present invention to reduce the risk of erosion, to reduce scattering of metallurgical grade silicon powder out of a reaction vessel by a jet, and to prevent local temperature increases in a fluid bed.

Solution to Problem

In order to attain the object, a fluidized-bed reactor in accordance with an aspect of the present invention is a fluidized-bed reactor for producing trichlorosilane by causing metallurgical grade silicon powder and a hydrogen chloride gas to react with each other, including a reaction vessel configured to contain the metallurgical grade silicon powder and the hydrogen chloride gas, the reaction vessel having a side wall surrounding a fluid bed which is formed by a flow of the metallurgical grade silicon powder which is caused to flow by the hydrogen chloride gas, the reaction vessel having a gas feed opening which is provided in a lower part of the reaction vessel and through which the hydrogen chloride gas is supplied, a portion of the side wall which portion extends along at least 80% of a height extending from the gas feed opening to a top face of the fluid bed having such a tapered shape that a cross section of the reaction vessel which cross section is taken perpendicular to a height direction of the reaction vessel increases in area in an upward direction.

Advantageous Effects of Invention

According to an aspect of the present invention, it is possible to reduce the risk of erosion, to reduce scattering of metallurgical grade silicon powder out of a reaction vessel by a jet, and to prevent local temperature increases in a fluid bed.

DESCRIPTION OF EMBODIMENTS

Embodiment 1

Method for Producing Trichlorosilane

Figure 4:
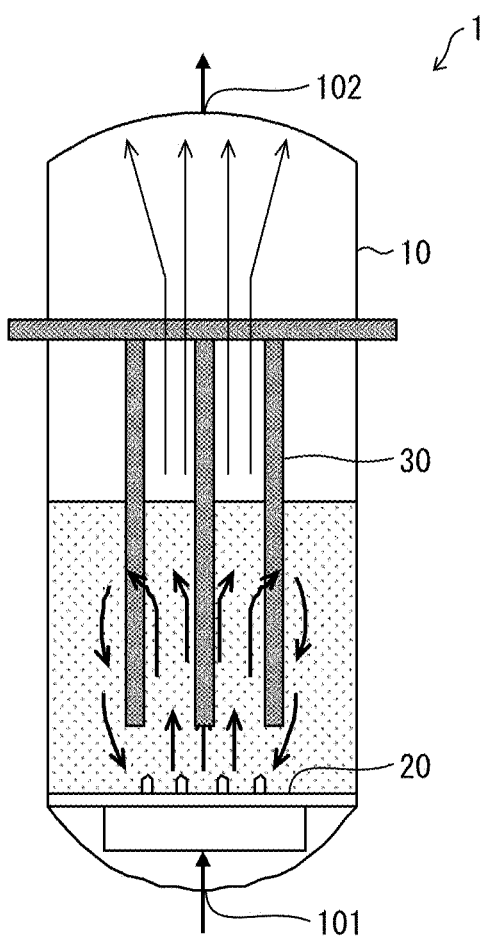
FIG. 4 is a cross-sectional view illustrating a configuration of a conventional fluidized-bed reactor.

FIG. 4 is a cross-sectional view illustrating a configuration of a conventional fluidized-bed reactor 1. Trichlorosilane ($SiHCl_3$) is produced by causing metallurgical grade silicon powder (Si) and a hydrogen chloride gas (HCl) to react with each other. Trichlorosilane is produced using the fluidized-bed reactor 1.

The fluidized-bed reactor 1 includes a reaction vessel 10, a distributor plate 20, and a heat transfer medium pipe 30. The fluidized-bed reactor 1 is arranged such that metallurgical grade silicon powder is supplied into the reaction vessel 10 and that a hydrogen chloride gas, which is to react with the metallurgical grade silicon powder, is supplied into the reaction vessel 10 through a gas inlet 101 provided at a bottom part of the reaction vessel 10. The distributor plate 20 is provided within the reaction vessel 10 so as to reside above the gas inlet 101, and serves to disperse the hydrogen chloride gas supplied into the reaction vessel 10.

The fluidized-bed reactor 1 allows the metallurgical grade silicon powder inside the reaction vessel 10 to react with the hydrogen chloride gas, while allowing the metallurgical grade silicon powder to flow by the hydrogen chloride gas, and allows trichlorosilane produced by the reaction between the metallurgical grade silicon powder and the hydrogen chloride gas to be taken out through an outlet 102 of the reaction vessel 10. Inside the reaction vessel 10, the heat transfer medium pipe 30, through which a heat transfer medium passes, is provided so as to extend in a vertical direction. The heat transfer medium is passed through the heat transfer medium pipe 30, so that heat resulting from the reaction between the metallurgical grade silicon powder and the hydrogen chloride gas is removed.

Note that flows of the metallurgical grade silicon powder and the hydrogen chloride gas to the fluidized-bed reactor 1 are disclosed in, for example, Japanese Patent Application Publication Tokukai No. 2011-184242, and therefore are not described here. Note that a flow of the trichlorosilane after the trichlorosilane is taken out of the fluidized-bed reactor 1 is disclosed in, for example, Japanese Patent Application Publication Tokukai No. 2015-089859, and therefore is not described here.

Configuration of Fluidized-Bed Reactor 1A

Figure 1:
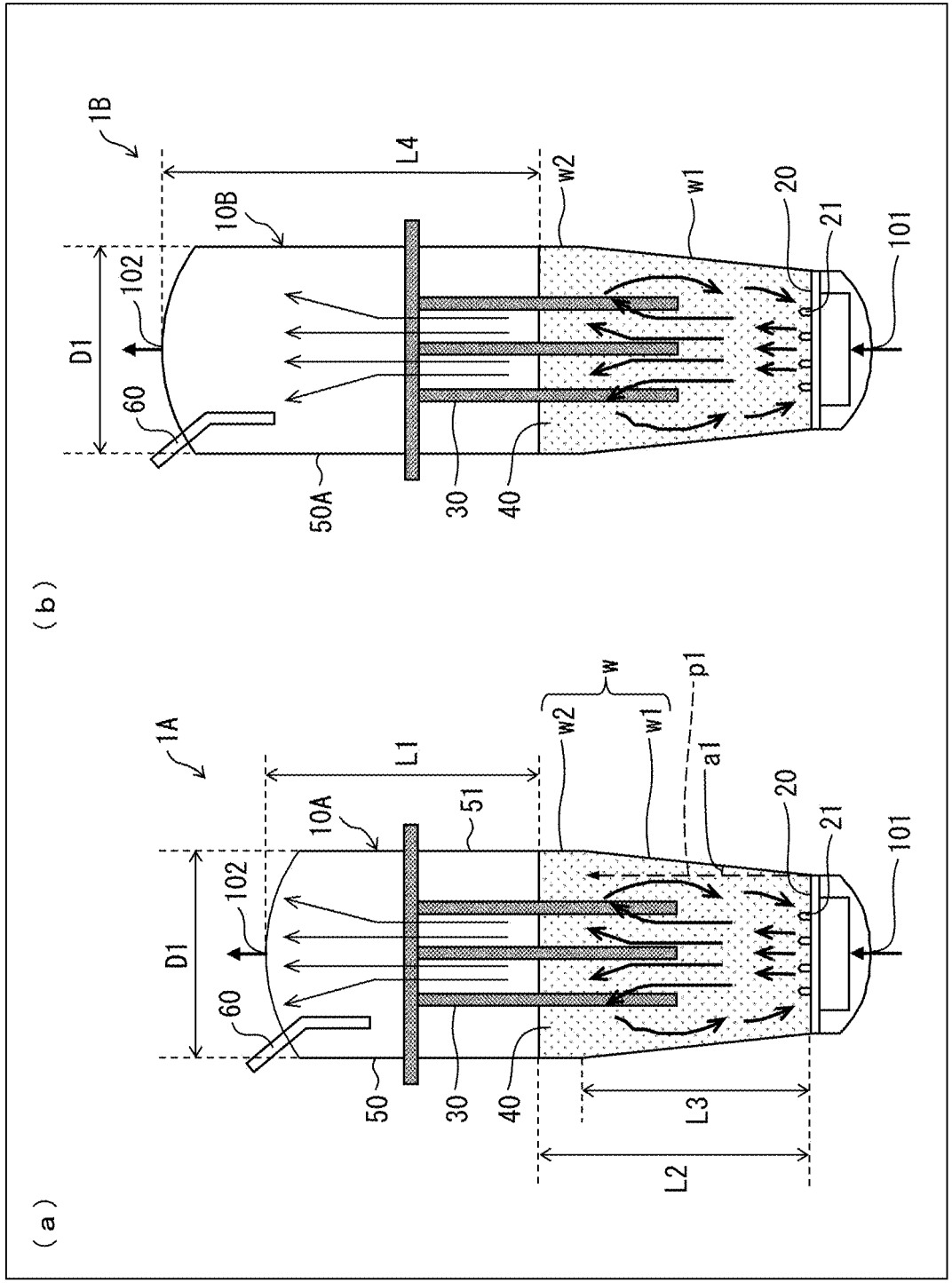
FIG. 1 is a cross-sectional view illustrating a configuration of a fluidized-bed reactor in accordance with Embodiment 1 of the present invention. (a) of FIG. 1 is a view illustrating a case in which a length of a freeboard section is L1, and (b) of FIG. 1 is a view illustrating a case in which the length of the freeboard section is L4.

FIG. 1 is a cross-sectional view illustrating a configuration of each of fluidized-bed reactors 1A and 1B in accordance with Embodiment 1 of the present invention. (a) of FIG. 1 is a view illustrating a case in which a length of a freeboard section 50 is L1, and (b) of FIG. 1 is a view illustrating a case in which the length of the freeboard section 50 is L4 (a length L of the freeboard section along a height direction of the freeboard section). The fluidized-bed reactor 1A produces trichlorosilane by causing metallurgical grade silicon powder and a hydrogen chloride gas to react with each other (a step of causing the metallurgical grade silicon powder and the hydrogen chloride gas to react with each other), and thus consumes the metallurgical grade silicon powder to be consumed.

The trichlorosilane is taken out from an upper part of the reaction vessel 10A. The fluidized-bed reactor 1A produces trichlorosilane in a manner similar to the fluidized-bed reactor 1. The fluidized-bed reactor 1A includes the reaction vessel 10A, a distributor plate 20, a heat transfer medium pipe 30, and a particle supply pipe 60 as illustrated in (a) of FIG. 1. Note that an outlet 102 side and a gas inlet 101 side of the fluidized-bed reactor 1A are referred to as an upper side and a lower side, respectively.

The reaction vessel 10A has the gas inlet 101, the outlet 102, side walls w1 and w2 and the freeboard section 50, and is configured to contain the metallurgical grade silicon powder and the hydrogen chloride gas. The gas inlet 101 serves to supply the hydrogen chloride gas from an outside of the reaction vessel 10A into the reaction vessel 10A. The gas inlet 101 is provided at a bottom part of the reaction vessel 10A, the bottom part being located below the distributor plate 20. The outlet 102 is provided in the upper part of the reaction vessel 10A and serves to allow a product of a reaction between the metallurgical grade silicon powder and the hydrogen chloride gas to be discharged to the outside of the reaction vessel 10A.

Although not shown in the drawings, it is common that a reaction vessel has, at a bottom part thereof, a bottom discharge powder outlet for discharging metallurgical grade silicon powder from a bottom of the reaction vessel to the outside in order to appropriately discharge metallurgical grade silicon powder (bottom discharge powder) which has been accumulated on the bottom of the reaction vessel due to a fluidity decrease resulting from a density increase caused by an impurity concentration increase in accordance with progress of the reaction.

Tapered Shape of Side Wall w

The side wall w surrounds a fluid bed 40 formed by a flow of metallurgical grade silicon powder which is caused to flow by the hydrogen chloride gas. The side wall w1 is a portion of the side wall w which portion has a tapered shape. Specifically, the side wall w1 has such a tapered shape that a cross section of the reaction vessel 10A which cross section is taken perpendicular to a height direction p1, which is a direction from a lower part of the reaction vessel 10A to the upper part of the reaction vessel 10A, increases in area in an upward direction. In other words, the side wall w1 has such a tapered that the cross section of the reaction vessel 10A which cross section is taken perpendicular to the height direction p1 increases in diameter in the upward direction.

A "tapered shape" is such a shape that its cross section is not limited to a straight line and that the cross section of the reaction vessel 10A which cross section is taken perpendicular to the height direction p1 continuously increases in area from the lower side to the upper side. The height direction p1 is perpendicular to an upper surface of the distributor plate 20. A taper angle al of the tapered shape of the side wall w is preferably not less than 3.0° and not more than 7.0°. The taper angle al of the tapered shape of the side wall w is an angle between the height direction p1 and the portion (the side wall w1) of the side wall w which portion has the tapered shape.

The side wall w2 is a portion of the side wall w which portion does not have a tapered shape and is parallel to the height direction p1. A length L2 is a length of the side wall w along the height direction p1. A length L3 is a length of the side wall w1 along the height direction p1. The length L3 is at least 80% of the length L2. Note that the side wall w may be arranged such that an upper portion (a portion on a freeboard section 50 side) of the side wall w has a tapered shape, or may be arranged such that a lower portion (a portion on a distributor plate 20 side) of the side wall w has a tapered shape.

That is, a portion of the side wall w which portion extends along at least 80% of a height extending from a gas feed opening 21 (described later) to a top face of the fluid bed 40 has such a tapered shape that a cross section of the reaction vessel 10A which cross section is taken perpendicular to the height direction p1 of the reaction vessel 10A increases in area in the upward direction. As a result, as shown by arrows in the fluid bed 40 in (a) of FIG. 1, the hydrogen chloride gas flowing in an opposite direction to the height direction p1 flows so as to avoid the hydrogen chloride gas flowing into the fluid bed 40. The arrows in the fluid bed 40 in (a) of FIG. 1 indicate the flows of the metallurgical grade silicon powder and the hydrogen chloride gas in the fluid bed 40.

Therefore, it is possible to reduce the risk of erosion, to reduce scattering of the metallurgical grade silicon powder out of the reaction vessel 10A by a jet, and to prevent local temperature increases in the fluid bed 40. In addition, it is possible to prevent generation of a drift in the fluid bed 40, thereby achieving a uniform temperature distribution in the fluid bed 40 so as to maintain a state of stable reaction between the metallurgical grade silicon powder and the hydrogen chloride gas in the fluid bed 40.

In addition, it is possible to prevent slacking in the fluid bed 40. Further, in a case where the heat transfer medium pipe 30 is provided along a vertical direction inside the reaction vessel 10A, designing the side wall w to have a tapered shape enables reducing wear of the heat transfer medium pipe 30.

The side wall w is preferably tapered from a boundary between the fluid bed 40 and the distributor plate 20 (described later). This allows a flow in the fluid bed 40 to be gentle from the boundary between the fluid bed 40 and the distributor plate 20, and accordingly allows also a flow in the vicinity of the distributor plate 20 in the fluid bed 40 to be gentle. Accordingly, even in the vicinity of the distributor plate 20 in the fluid bed 40 where erosion is particularly likely to occur, it is possible to reduce the risk of erosion and to prevent local temperature increases.

In addition, in a case where the taper angle al of the tapered shape of the side wall w is not less than 3.0°, hydrogen chloride gas flowing in a direction opposite to the height direction p1 flows so as to avoid hydrogen chloride gas flowing into the fluid bed 40. This renders the flow in the fluid bed 40 gentle, thereby making it possible to reduce the risk of erosion and to prevent local temperature increases in the fluid bed 40. Further, by setting the taper angle al of the tapered shape of the side wall w to be not more than 7.0°, it is possible to prevent hydrogen chloride gas flowing in the height direction p1 from spreading too much in a direction perpendicular to the height direction p1. Further, it is possible to maintain a linear velocity in the fluid bed 40 at an appropriate level also in the upper part of the reaction vessel 10A, and thus to render the flow in the fluid bed 40 smooth.

The distributor plate 20 is provided in the lower part of the reaction vessel 10A and has the gas feed opening 21. The distributor plate 20 disperses the hydrogen chloride gas from the gas feed opening 21. The gas feed opening 21 may be, for example, a plurality of nozzles for dispersing the hydrogen chloride gas. The hydrogen chloride gas passes through the gas inlet 101 and the gas feed opening 21 in this order, and is supplied into the reaction vessel 10A.

The particle supply pipe 60 serves to supply the metallurgical grade silicon powder into the reaction vessel 10A. That is, the metallurgical grade silicon powder is supplied from the outside of the reaction vessel 10A into the reaction vessel 10A via the particle supply pipe 60. The metallurgical grade silicon powder and the hydrogen chloride gas are supplied into the reaction vessel 10A, and the fluid bed 40 is formed by a flow of the metallurgical grade silicon powder which is caused to flow by the hydrogen chloride gas. In the fluidized-bed reactor 1A, the metallurgical grade silicon powder is intermittently supplied into the reaction vessel 10A. Accordingly, the fluidized-bed reactor 1A is operated so that the height extending from the gas feed opening 21 to the top face of the fluid bed 40 is maintained constant.

Inside the reaction vessel 10A, the heat transfer medium pipe 30, through which a heat transfer medium passes, is provided so as to extend along the vertical direction. The heat transfer medium is passed through the heat transfer medium pipe 30, so that heat resulting from the reaction between the metallurgical grade silicon powder and the hydrogen chloride gas is removed.

Configuration of Freeboard Section 50

The freeboard section 50 is formed by an outer wall 51 extending along the height direction p1 from the side wall w (the side wall w2) and directs, to the outlet 102, a product ascending from the fluid bed 40. The product is a product of a reaction between the metallurgical grade silicon powder and the hydrogen chloride gas. The length L1 is a length of the freeboard section 50 along the height direction p1. A diameter D1 (a diameter D of a cross section of the freeboard section which cross section is taken perpendicular to the height direction) is a diameter of the cross section of the freeboard section 50 which cross section is taken perpendicular to the height direction p1.

Materials for Fluidized-Bed Reactor 1A

Known materials are employed as materials of the respective members of the fluidized-bed reactor 1A without any particular restriction, and stainless steel is generally used. Among the members of the fluidized-bed reactor 1A, in particular, the reaction vessel 10A is in an environment where stress-corrosion cracking is likely to occur in a welded part of the reaction vessel 10A due to thermal influences. For this reason, it is preferable to apply a solution treatment and/or a melting treatment to the welded part of the reaction vessel 10A in order to cause chromium carbide which has been deposited at grain boundaries to be redissolved in a matrix.

In order to prevent stress-corrosion cracking, it is also preferable to perform a shot peening process in which a metallic sphere is caused to collide with a wall surface inside the reaction vessel 10A at a high speed, as a method for improving a residual stress of the reaction vessel 10A. Each of the solution treatment, the melting treatment and the shot peening process may be performed alone or in combination of two or more thereof. In a case of performing the above processes in combination, it is preferable to perform the shot peening process after performing the solution treatment and/or the melting treatment.

Further, it is preferable that the solid solution treatment, the melting treatment, and/or the shot peening process be applied also to the distributor plate 20, the heat transfer medium pipe 30, the freeboard section 50, the particle supply pipe 60, and the like in order to prevent stress-corrosion cracking.

Further, in order to prevent stress-corrosion cracking, it is also preferable to perform a spraying treatment in which alloy powder made of tungsten carbide or the like is melted and then sprayed onto the respective members of the fluidized-bed reactor 1A to form a film.

Further, the heat transfer medium pipe 30 is preferably made of a corrosion-resistant material, such as Inconel or Hastelloy.

Variation 1

The fluidized-bed reactor 1B differs from the fluidized-bed reactor 1A in that the freeboard section 50 is replaced with a freeboard section 50A, as illustrated in (b) of FIG. 1. The length L4 is a length of the freeboard section 50A along the height direction p1. The length L4 is greater than the length L1.

Figure 2:
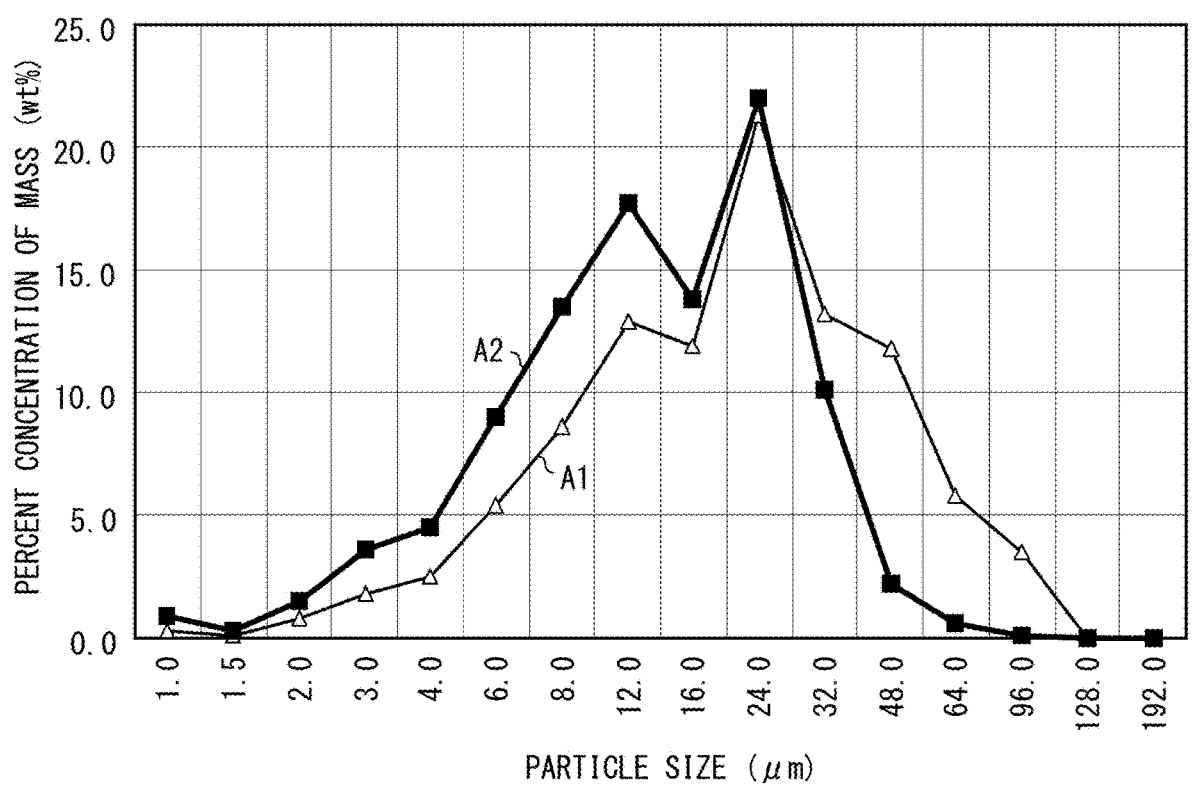
FIG. 2 is a graph showing a relationship between a particle size and a percent concentration of mass of metallurgical grade silicon powder.

FIG. 2 is a graph showing a relationship between a particle size and a percent concentration of mass of metallurgical grade silicon powder. In FIG. 2, a line A1 shows results obtained in a case where metallurgical grade silicon powder and a hydrogen chloride gas were caused to react with each other with use of the fluidized-bed reactor 1A, and a line A2 shows results obtained in a case where metallurgical grade silicon powder and a hydrogen chloride gas were caused to react with each other with use of the fluidized-bed reactor 1B. Here, it is assumed that the length L1 is 1600 mm and the length L4 is 3900 mm, for example.

As shown in FIG. 2 and Table 1 below, in the case where the fluidized-bed reactor 1A was used (in the case where the length L1 of the freeboard section 50 was 1600 mm), an average particle size (μm) of scattered powder was 18.2 (μm). In this case, among the scattered powder, a percent concentration of mass (wt %) of a particle having a particle size of not less than 32 μm relative to all particles was 21.2 (wt %). Note that "scattered powder" is metallurgical grade silicon powder discharged to the outside of the reaction vessel through the outlet 102.

TABLE 1

| | | Length of freeboard section = 1600 m | Length of freeboard section = 3900 m |
|---|---|---|---|
| Scattered powder | Average particle size (μm) | 18.2 | 11.8 |
| | Percent concentration of mass (wt %) of particle having particle size of not less than 32 μm (wt %) | 21.2 | 3.0 |

TABLE 1-continued

|  |  | Length of freeboard section = 1600 m | Length of freeboard section = 3900 m |
|---|---|---|---|
| Bottom discharge powder | Operation | 1 batch (160 kg)/week | 2 batches (320 kg)/week |
|  | Average particle size (μm) | 150 | 153 |

In the case where the fluidized-bed reactor 1A was used, an amount of bottom discharge powder was 160 kg per week. Specifically, once a week, metallurgical grade silicon powder that has accumulated at the bottom of the reaction vessel 10A (on the upper surface of the distributor plate 20) must be discharged from the bottom of the reaction vessel 10A to the outside of the reaction vessel 10A. The metallurgical grade silicon powder is discharged, in an amount of 160 kg at a time, from the bottom of the reaction vessel 10A to the outside of the reaction vessel 10A. An average particle size (μm) of the bottom discharge powder was 150 (μm).

In the case where the fluidized-bed reactor 1B was used (in the case where the length L4 of the freeboard section 50 was 3900 mm), an average particle size of scattered powder was 11.8 (μm). In this case, among the scattered powder, a percent concentration of mass of a particle having a particle size of not less than 32 μm relative to all particles was 3.0 (wt %).

In the case where the fluidized-bed reactor 1B was used, an amount of bottom discharge powder was 320 kg per week. Specifically, twice a week, metallurgical grade silicon powder that has accumulated at the bottom of the reaction vessel 10B (on the upper surface of the distributor plate 20) must be discharged from the bottom of the reaction vessel 10B to the outside of the reaction vessel 10B. The metallurgical grade silicon powder is discharged, in an amount of 160 kg at a time, from the bottom of the reaction vessel 10B to the outside of the reaction vessel 10A. An average particle size (μm) of the bottom discharge powder was 153 (μm).

Thus, a percent concentration of mass of a particle having a particle size of not less than 32 μm relative to a total amount of particles is smaller in the case where the fluidized-bed reactor 1B was used than in the case where the fluidized-bed reactor 1A was used. An average particle size of scattered powder is also smaller in the case where fluidized-bed reactor 1B was used than in the case where the fluidized-bed reactor 1A was used.

As shown in Table 1, an amount of bottom discharge powder is greater in the case where the fluidized-bed reactor 1B was used than in the case where the fluidized-bed reactor 1A was used. However, an amount of metallurgical grade silicon powder lost was lower in the case where the fluidized-bed reactor 1B was used than in the case where the fluidized-bed reactor 1A was used, by as much as approximately 77%. Note that "an amount of metallurgical grade silicon powder lost" is an amount obtained by subtracting a total amount of metallurgical grade silicon powder reacted with hydrogen chloride gas from a total amount of metallurgical grade silicon powder supplied from the outside of the reaction vessel into the reaction vessel. In other words, "an amount of metallurgical grade silicon powder lost" is a sum of (i) an amount of metallurgical grade silicon powder remaining in the reaction vessel without reacting with the hydrogen chloride gas and (ii) an amount of metallurgical grade silicon powder discharged from the outlet 102 to the outside of the reaction vessel without reacting with the hydrogen chloride gas.

Considering only the fact that the amount of bottom discharge powder is higher in the fluidized-bed reactor 1B than in the fluidized-bed reactor 1A, it may seem that the fluidized-bed reactor 1B is less efficient than the fluidized-bed reactor 1A in producing trichlorosilane. However, since a reduction in amount of metallurgical grade silicon powder entrained in a gas discharged from the outlet was achieved, in terms of the entire production process of trichlorosilane, the amount of metallurgical grade silicon powder lost was successfully achieved by as much as approximately 77%, as described above. Therefore, the fluidized-bed reactor 1B is more efficient in producing trichlorosilane than the fluidized-bed reactor 1A.

The reason why the amount of metallurgical grade silicon powder lost was successfully reduced by approximately 77% is that increasing a ratio of the length of the freeboard section along the height direction p1 to the diameter of the cross section of the freeboard section taken perpendicular to the height direction p1 reduces an amount of metallurgical grade silicon powder scattered to the upper part of the reaction vessel.

That is, increasing the ratio of the length of the freeboard section along the height direction p1 to the diameter of the cross section of the freeboard section taken perpendicular to the height direction p1 reduces a percent concentration of mass of scattered powder. In addition, an average particle size of the scattered powder is reduced, and the amount of metallurgical grade silicon powder scattered to the upper part of the reaction vessel is reduced. This enables reducing the amount of metallurgical grade silicon powder lost. Further, by increasing the ratio of the length of the freeboard section along the height direction p1 to the diameter of the cross section, taken perpendicular to the height direction p1, of the freeboard section, it is possible to improve a heat removal efficiency of the fluidized-bed reactor 1B.

Note that a ratio L4/D1 of the length L4 to the diameter D1 is preferably not less than 1.5. In such a case, it is possible to consume metallurgical grade silicon powder without providing a cyclone in the reaction vessel 10B. It is also possible to reduce an average particle size of scattered metallurgical grade silicon powder, and thus reduce an amount of metallurgical grade silicon powder lost. Further, it is possible to improve a heat removal efficiency of the fluidized-bed reactor 1B.

In a case where the ratio L4/D1 of the length L4 to the diameter D1 is not less than 1.5, it is possible to reduce an amount of metallurgical grade silicon powder scattered to the upper part of the reaction vessel 10B. Determining the ratio L4/D1 of the length L4 to the diameter D1 allows determining an approximate particle size of metallurgical grade silicon powder to be discharged from the upper part of the reaction vessel 10B to the outside of the reaction vessel 10B.

Embodiment 2

Figure 3:
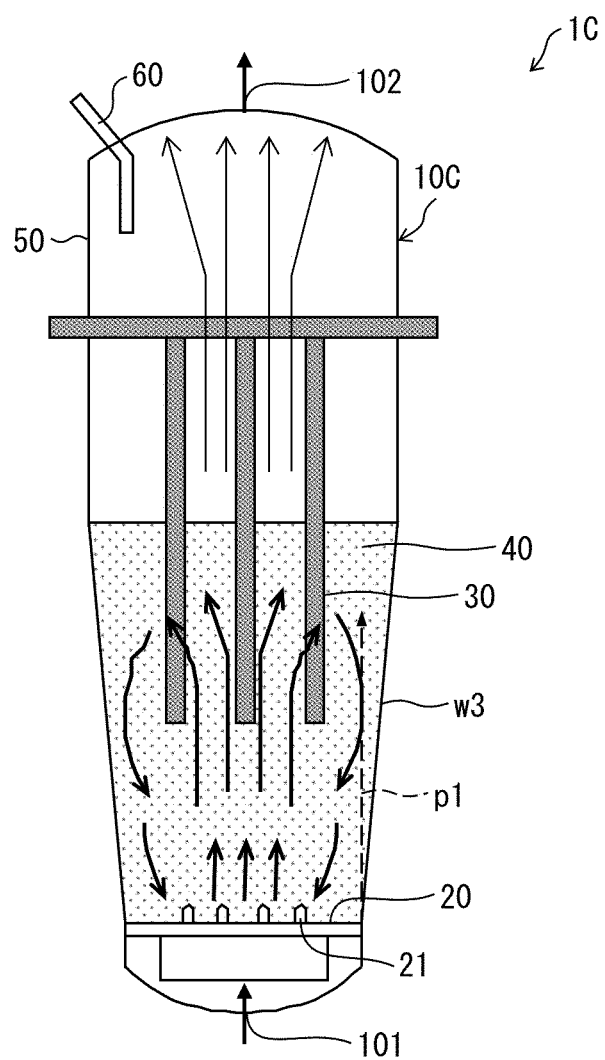
FIG. 3 is a cross-sectional view illustrating a configuration of a fluidized-bed reactor in accordance with Embodiment 2 of the present invention.

FIG. 3 is a cross-sectional view illustrating a configuration of a fluidized-bed reactor 1C in accordance with Embodiment 2 of the present invention. For convenience of description, members having the same functions as those of the members described in Embodiment 1 are denoted by the same reference numerals, and description thereof will not be repeated.

The fluidized-bed reactor 1C differs from the fluidized-bed reactor 1A in that the reaction vessel 10A is replaced with a reaction vessel 10C, as illustrated in FIG. 3. A side wall w3 of the reaction vessel 10C surrounds a fluid bed 40. The side wall w3 has a tapered shape throughout a height extending from a gas feed opening 21 to a top face of the fluid bed 40. This allows the flow in the entire fluid bed 40 to be gentle, thereby making it possible, in the entire fluid bed 40, to reduce the risk of erosion and to prevent local temperature increases.

Note that a cross section of a side wall of a reaction vessel of a fluidized-bed reactor is generally a straight line as illustrated in FIG. 1. However, the present invention is not limited to this, and the cross section may be a curved line or a combination of a straight line and a curved line, within the technical scope of the present invention.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

A fluidized-bed reactor in accordance with an aspect of the present invention is a fluidized-bed reactor for producing trichlorosilane by causing metallurgical grade silicon powder and a hydrogen chloride gas to react with each other, including a reaction vessel configured to contain the metallurgical grade silicon powder and the hydrogen chloride gas, the reaction vessel having a side wall surrounding a fluid bed which is formed by a flow of the metallurgical grade silicon powder which is caused to flow by the hydrogen chloride gas, the reaction vessel having a gas feed opening which is provided in a lower part of the reaction vessel and through which the hydrogen chloride gas is supplied, a portion of the side wall which portion extends along at least 80% of a height extending from the gas feed opening to a top face of the fluid bed having such a tapered shape that a cross section of the reaction vessel which cross section is taken perpendicular to a height direction of the reaction vessel increases in area in an upward direction.

According to the above configuration, the portion of the side wall which portion extends along at least 80% of the height extending from the gas feed opening to the top face of the fluid bed has such a tapered shape that a cross section of the reaction vessel which cross section is taken perpendicular to the height direction of the reaction vessel increases in area in the upward direction. This makes it possible to reduce the risk of erosion, to reduce scattering of the metallurgical grade silicon powder out of the reaction vessel by a jet, and to prevent local temperature increases in the fluid bed.

In an aspect of the present invention, the fluidized-bed reactor is preferably configured such that the fluidized-bed reactor further includes a distributor plate having the gas feed opening and configured to disperse the hydrogen chloride gas from the gas feed opening, the distributor plate being provided in the lower part of the reaction vessel, the side wall having the tapered shape from a boundary between the fluid bed and the distributor plate.

According to the above configuration, the side wall has the tapered shape from the boundary between the fluid bed and the distributor plate. This allows a flow in the fluid bed to be gentle from the boundary between the fluid bed and the distributor plate, and accordingly allows also a flow in the vicinity of the distributor plate in the fluid bed to be gentle.

Accordingly, even in the vicinity of the distributor plate in the fluid bed where erosion is particularly likely to occur, it is possible to reduce the risk of erosion and to prevent local temperature increases.

In an aspect of the present invention, the fluidized-bed reactor is preferably configured such that the side wall has the tapered shape throughout the height extending from the gas feed opening to the top face of the fluid bed.

According to the above configuration, the side wall has the tapered shape throughout the height extending from the gas feed opening to the top face of the fluid bed. This allows the flow in the entire fluid bed to be gentle, thereby making it possible, in the entire fluid bed, to reduce the risk of erosion and to prevent local temperature increases.

In an aspect of the present invention, the fluidized-bed reactor is preferably configured such that a taper angle of the tapered shape is an angle between the height direction and the portion of the side wall which portion has the tapered shape, the taper angle being not less than 3.0° and not more than 7.0°.

According to the above configuration, the taper angle of the tapered shape is not less than 3.0° and not more than 7.0°. Since the taper angle of the tapered shape is not less than 3.0°, hydrogen chloride gas flowing in a direction opposite to the height direction flows so as to avoid hydrogen chloride gas flowing into the fluid bed. This renders the flow in the fluid bed gentle, thereby making it possible to reduce the risk of erosion and to prevent local temperature increases in the fluid bed.

Further, since the taper angle of the tapered shape is 7.0° or less, it is possible to prevent hydrogen chloride gas flowing in a direction opposite to the height direction from spreading too much in a direction perpendicular to the height direction, and thus to render the flow in the fluid bed smooth.

In an aspect of the present invention, the fluidized-bed reactor is preferably configured such that: the reaction vessel further has a freeboard section formed by an outer wall which extends from the side wall along the height direction; the reaction vessel has an outlet which is provided in an upper part of the reaction vessel and through which a product of a reaction between the metallurgical grade silicon powder and the hydrogen chloride gas is discharged; the freeboard section guides, to the outlet, the product ascending from the fluid bed; and a ratio L/D of a length L of the freeboard section along the height direction to a diameter D of a cross section of the freeboard section which cross section is taken perpendicular to the height direction is not less than 1.5.

According to the above configuration, the ratio L/D of the length L of the freeboard section along the height direction to the diameter D of the cross section of the freeboard section which cross section is taken perpendicular to the height direction is not less than 1.5. This makes it possible to reduce, without providing a cyclone in the reaction vessel, an amount of metallurgical grade silicon powder entrained in a gas discharged from the reaction vessel.

In an aspect of the present invention, a method for producing trichlorosilane in accordance with an aspect of the present invention preferably includes the step of causing metallurgical grade silicon powder and the hydrogen chloride gas to react with each other with use of the fluidized-bed reactor.

REFERENCE SIGNS LIST 1, 1A, 1B, 1C: Fluidized-bed reactor
10, 10A, 10B, 10C: Reaction vessel 20: Distributor plate
21: Gas feed opening
30: Heat transfer medium pipe
40: Fluid bed
50, 50A: Freeboard section
60: Particle supply pipe
101: Gas inlet
102: Outlet
D1: Diameter
L1, L2, L3, L4: Length
p1: Height direction
w, w1, w2, w3: Side wall

The invention claimed is:

1. A fluidized-bed reactor for producing trichlorosilane by causing metallurgical grade silicon powder and a hydrogen chloride gas to react with each other, comprising a
   reaction vessel configured to contain the metallurgical grade silicon powder and the hydrogen chloride gas,
      the reaction vessel having a side wall surrounding a fluid bed which is formed by a flow of the metallurgical grade silicon powder which is caused to flow by the hydrogen chloride gas,
      the reaction vessel having a gas feed opening which is provided in a lower part of the reaction vessel and through which the hydrogen chloride gas is supplied,
   a portion of the side wall which portion extends along at least 80% of a height extending from the gas feed opening to a top face of the fluid bed having such a tapered shape that a cross section of the reaction vessel which cross section is taken perpendicular to a height direction of the reaction vessel increases in area in an upward direction,
   a distributor plate having the gas feed opening and configured to disperse the hydrogen chloride gas from the gas feed opening,
      the distributor plate being provided in the lower part of the reaction vessel,
      the side wall having the tapered shape from a boundary between the fluid bed and the distributor plate.

2. The fluidized-bed reactor as set forth in claim 1, wherein the side wall has the tapered shape throughout the height extending from the gas feed opening to the top face of the fluid bed.

3. The fluidized-bed reactor as set forth in claim 1, wherein a taper angle of the tapered shape is an angle between the height direction and the portion of the side wall which portion has the tapered shape, the taper angle being not less than 3.0° and not more than 7.0°.

4. The fluidized-bed reactor as set forth in claim 1, wherein:
   the reaction vessel further has a freeboard section formed by an outer wall which extends from the side wall along the height direction;
   the reaction vessel has an outlet which is provided in an upper part of the reaction vessel and through which a product of a reaction between the metallurgical grade silicon powder and the hydrogen chloride gas is discharged;
   the freeboard section guides, to the outlet, the product ascending from the fluid bed; and
   a ratio L/D of a length L of the freeboard section along the height direction to a diameter D of a cross section of the freeboard section which cross section is taken perpendicular to the height direction is not less than 1.5.

5. A method for producing trichlorosilane, comprising the step of causing the metallurgical grade silicon powder and the hydrogen chloride gas to react with each other with use of a fluidized-bed reactor recited in claim 1.

* * * * *